Sept. 6, 1932.  V. V. GREG  1,875,442
BELT SCRAPER
Filed Dec. 13, 1930
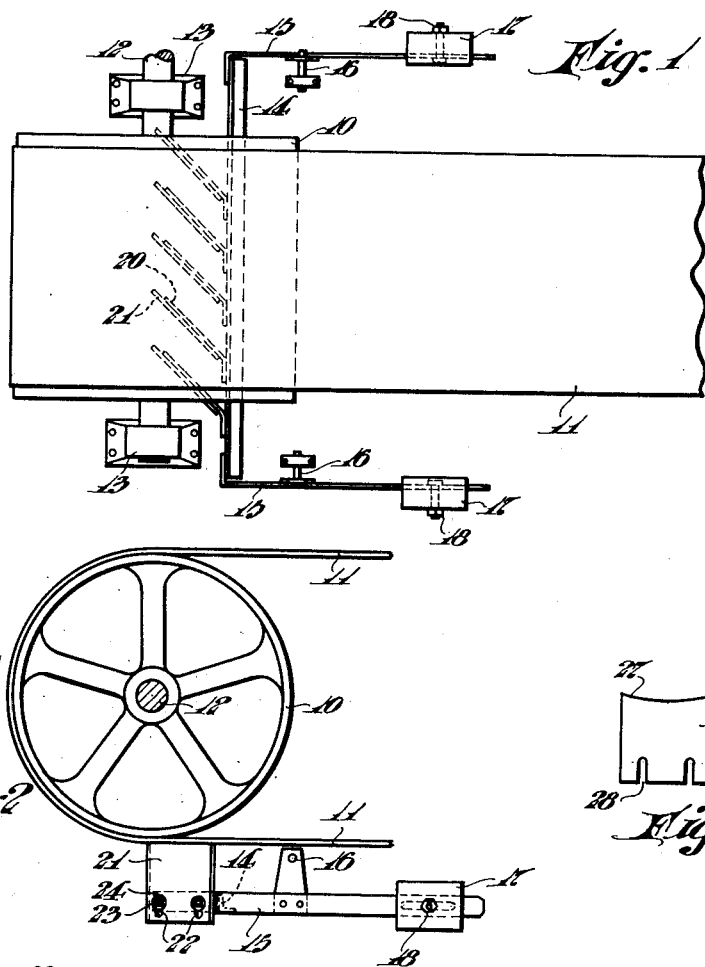
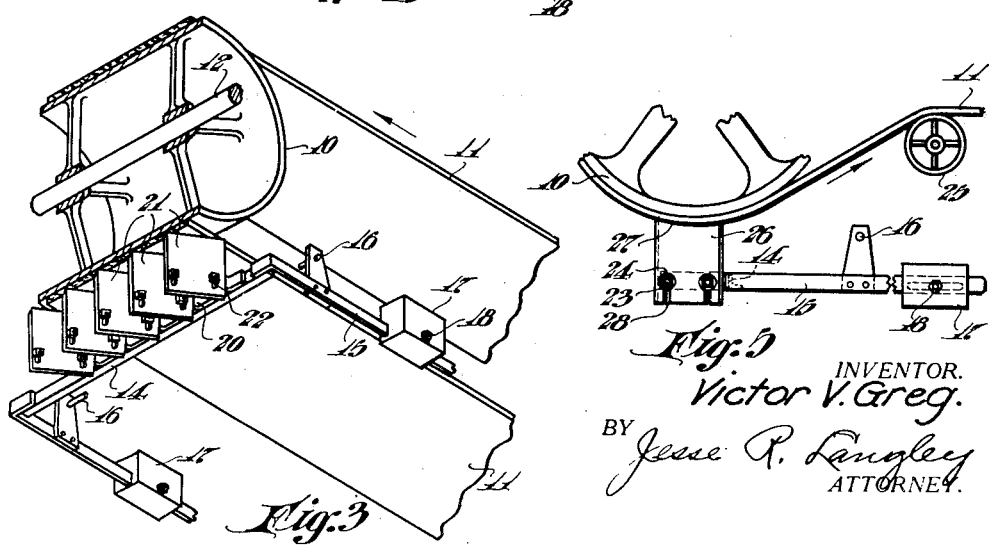
INVENTOR.
Victor V. Greg.
BY Jesse R. Langley
ATTORNEY.

Patented Sept. 6, 1932

1,875,442

UNITED STATES PATENT OFFICE

VICTOR V. GREG, OF DORMONT, PENNSYLVANIA, ASSIGNOR TO THE KOPPERS COMPANY OF DELAWARE, A CORPORATION OF DELAWARE

BELT SCRAPER

Application filed December 13, 1930. Serial No. 502,135.

This invention relates to belt scrapers, and more particularly to apparatus of this character for use in connection with conveyors for handling various materials which may contain finely-divided particles.

The preferred embodiment disclosed herein has been found desirable in connection with the handling of materials and products of the coal distillation industry, such as coal, coke, ammonium sulphate and the like, for the purpose of removing accumulated, undesirable or foreign particles from the operating surface of the conveyor belt, although the use of the invention is not limited to the handling of these materials.

Rotary bristle brushes and fluted rubber rollers have been suggested for this purpose, but the same have been unsatisfactory in view of their expense. These devices have not only had a high initial installation cost, but they have also required power drive and have been subject to excessive wear, so that maintenance cost has also been very high. Thus, the initial cost and upkeep of the rotary types of scrapers have confined their use to installations where their expense is of secondary consideration.

Another type of scraper heretofore employed has comprised a stationary flat straight scraper element, but this arrangement has been unsatisfactory in that it has also been subject to excessive wear, and furthermore, the mounting of the same has been such that it has not had sufficient rigidity to withstand proper operating pressures, resulting in low efficiency.

Objects of the invention are therefore to provide a simple and inexpensive device for the purposes described, which will have sufficient rigidity to withstand proper operating pressures, and be simple and inexpensive to manufacture as well as efficient in operation.

Other objects and features of novelty will be apparent as the following description proceeds, reference being had to the accompanying drawing, in which Figure 1 is a plan view of one end of a conveyor, showing the belt scraper according to the preferred embodiment of the present invention as applied thereto;

Fig. 2 is a side elevation of the structure shown in Fig. 1;

Fig. 3 is a perspective view looking upwardly at the structure shown in Figs. 1 and 2, portions being broken away and shown in section to better illustrate the same;

Fig. 4 is a detail of a modified form of scraper element; and

Fig. 5 is an assembly view similar to Fig. 2 but showing the mounting of the modified scraper element.

Referring more particularly to the drawing, the invention is illustrated in conjunction with a conveyor of which there is shown a bend pulley 10 and a belt 11 passing thereover. The pulley 10 is carried by a shaft 12 journaled in hangers 13. The belt 11 may be of any desired belting material, preferably canvas or duck impregnated with rubber, although leather or plain canvas may be employed for this purpose.

Pivotally mounted below the lower reach of the conveyor 11 is a frame bar 14, the ends of which are secured to arms 15 that are pivoted intermediate their ends as at 16, and counterbalanced so as to exert an upward pressure on the bar 14. The counterbalancing means comprises a counterweight 17 slidably mounted on the arms 15, and adjustably secured in position by a set screw or the like 18. The structure described above is known in the art, being the structure to which the present invention is adapted to be applied, and has formed no part of the present invention other than in combination with the structure now to be described.

Rigidly secured to the frame bar 14 are a plurality of abutment members 20 which are disposed at an oblique angle thereto, and preferably arranged in uniformly spaced relation therealong. Each of the abutment members 20 carries a scraper element 21, which is preferably of a material having the characteristics of the belt 11.

Thus the scraper element 21 is preferably constructed of belting material, and where new material is employed, transmission belting is preferred in view of its cheapness.

Where worn and discarded conveyor belts similar to the belt 11 are available, the same may be economically and advantageously employed for this purpose, the pieces 21 being cut from such discarded conveyor belting. Of course, scrap leather or various forms of scrap rubber impregnated canvas may be utilized for this purpose.

The scraper elements 21 are provided with a pair of slots 22 through which pass bolts 23, by means of which the scraper elements 21 may be clamped to the abutment members 20. Washers 24 are preferably employed on the side of the pieces 21 opposite to the abutment members 20 so as to afford a backing for the clamping means.

The scraper assembly including the bar 14 and its frame having the scraper elements 21 mounted thereon, is preferably mounted below the axis of the bend pulley 10. With the form shown in Fig. 2, the front edges of the scraper elements 21 are shown as lying in a vertical plane through the axis of the pulley, which plane passes through the line of tangency of the belt 11 with the bend pulley 10. In this form, the lower reach of the conveyor 11 is horizontal, and the upper edge of the scraper element 21 is also straight and horizontal and thus contacts therewith throughout its extent.

In operation, the pulley 10 being driven in a counterclockwise direction, as shown in Fig. 2, accumulated foreign or undesirable particles carried thereby will be scraped off by the upper edge of the scraper elements 21. It should be noted that the oblique angular disposition of the scraper edge effects a sort of diagonal cut and thus results in an improved scraping action. Furthermore, the oblique angular disposition results in an increased moment of inertia for the scraper element, giving it greater rigidity so that it will not be buckled due to either the upward pressure imposed by the counterbalance means 17, or by the drag of the conveyor belt 11 on the upper edge of the scraper.

The accumulated particles removed by the scraper 21 will drop off and fall downward into a chute, receptacle or conveyor (not shown), the same forming no part of the present invention.

The lower reach of the conveyor 11 is often inclined upwardly as it passes off of the bend pulley 10, as is shown in Fig. 5. This may be due to the inclined position of the conveyor as a whole, or to the mounting of an idler or belt tightener 25 in conjunction with the lower reach of the conveyor. With this arrangement, a modified form of scraper element 26 as shown in Fig. 4 is provided.

As it is preferred to have the scraper element 26 substantially in vertical alignment with the shaft 12, the upper edge of the element 26 is cut away and curved as at 27 so as to fit the curved surface of the belt 11 which is still in contact with the periphery of the bend pulley 10. In this form, slots 28 extend through the lower edge of the element 26. This arrangement permits more rapid interchange and renewal of worn scraper elements, than the closed slots 22 shown in Fig. 2.

The mounting of the arms 15 and other portions of the scraper supporting device are identical with those described in connection with the preceding modification, and hence need not be again described in detail. The curved edge 27 insures that the edge of the element 26 will contact throughout its extent with the surface of the belt 11, and at the same time all other advantages of the invention are preserved.

While an embodiment of the invention has been illustrated and described in such detail as to enable anyone skilled in the art to practice the invention, nevertheless it is to be understood that the invention is not to be limited to any of the details disclosed, other than as necessitated by the development of the prior art; but instead it will be understood that the invention embraces such embodiments of the broad idea as fall within the scope of the appended claims, it being obvious that various changes may be resorted to without departing from the spirit of the invention.

I claim as my invention:

1. In a belt scraper, a plurality of upstanding scraper elements in spaced relation disposed at an oblique angle to the direction of travel of the belt, and having upper edges comprising concave portions.

2. In a belt scraper, a frame bar, a pivotally mounted frame carrying said bar, means for adjustably counterbalancing said frame to exert an upward pressure on said bar, abutment members carried by said bar in spaced relation therealong and at an angle thereto, a plurality of scraper elements comprising pieces of belting material having slots therein, means passing through said slots for clamping said pieces to said abutments, and backing means for said clamping means on the other side of said scraper elements.

3. In combination with a conveyer having a pulley and a belt supported thereby, a plurality of scraper elements in contact with a portion of said belt on said pulley and disposed at an oblique angle to the axis of said pulley.

4. In combination with a conveyor having a pulley and a belt supported thereby, a plurality of scraper elements disposed radially of the axis of said pulley and having their upper edges in contact with the outer surface of said conveyor belt in spaced relation substantially along the line of tangency of said belt and pulley.

5. In combination with a conveyor having a bend pulley and a belt passing thereover, a plurality of scraper elements disposed substantially vertically below the axis of said bend pulley and having their upper edges in contact with the outer surface of said conveyor belt in spaced relation substantially along the line of tangency of said belt and pulley, said edges extending onto the straight portion of said belt.

6. In combination with a conveyor having a bend pulley and a belt passing thereover, a plurality of scraper elements disposed substantially vertically below the axis of said bend pulley and having their upper edges in contact with the outer surface of said conveyor belt in spaced relation substantially along the line of tangency of said belt and pulley, said edges extending onto the portion of said belt which is in contact with said pulley, and being cut to fit the same.

7. In combination with a conveyor having a bend pulley and a belt passing thereover, a frame mounted below the axis of said bend pulley, a plurality of scraper elements comprising substantially flat pieces of belting, means for clamping said scraper elements to said frame in spaced relation at an oblique angle to the axis of said pulley, and means for urging said frame toward said pulley axis to cause the upper edges of said scraper elements to contact with the outer surface of said belt.

8. In a belt scraper, a plurality of scraper elements spaced along a line perpendicular to the direction of travel of the belt and each disposed at an oblique angle thereto.

9. In a belt scraper, a frame bar, a plurality of scraper elements, abutment members associated with said bar in spaced relation therealong and at an angle thereto, and means associated with said abutments for clamping said elements between said means and said abutments.

10. In a belt scraper, in combination with a bend pulley and a belt passing thereover, a frame comprising a bar extending transversely of said belt, and a pair of arms extending laterally from said bar, abutment members extending from said bar at an oblique angle thereto, and scraper elements respectively carried by said abutment members.

11. In a belt scraper, in combination with a bend pulley and a belt passing thereover, a frame comprising a bar extending transversely of said belt, and a pair of arms extending laterally from said bar, abutment members extending from said bar at an oblique angle thereto, scraper elements respectively carried by said abutment members, and means engaging said arms for urging said scraper elements into contact with said belt.

12. In a belt scraper, in combination with a bend pulley and a belt passing thereover, a frame comprising a bar extending transversely of said belt, and a pair of arms extending laterally from said bar, abutment members extending from said bar at an oblique angle thereto, scraper elements carried by said abutment members, said arms being pivoted intermediate their ends and provided with counterweights adapted to urge said scraper elements into contact with said belt.

In testimony whereof, I have hereunto subscribed my name this 8th day of December 1930.

VICTOR V. GREG.